United States Patent [19]

Morris et al.

[11] 4,236,896
[45] Dec. 2, 1980

[54] SLURRY REMOVAL PROCESS

[75] Inventors: Alan J. Morris; Theodore A. Rado, both of Oklahoma City, Okla.

[73] Assignee: Kerr-McGee Corporation, Oklahoma City, Okla.

[21] Appl. No.: 876,254

[22] Filed: Feb. 9, 1978

[51] Int. Cl.³ .............................................. F17D 1/16
[52] U.S. Cl. .................................. 23/293 R; 137/13; 137/14
[58] Field of Search .................. 137/14, 340, 334, 13; 23/293 R; 208/100; 210/57, 71, 72; 209/11; 422/207, 208, 232, 235

[56] References Cited

U.S. PATENT DOCUMENTS

| | | | |
|---|---|---|---|
| 1,970,871 | 8/1934 | Tate et al. | 137/14 |
| 3,389,714 | 6/1968 | Hughes et al. | 137/13 |
| 3,646,950 | 3/1972 | Takehisa | 137/14 |
| 4,098,583 | 7/1978 | Tippmer | 209/11 |
| 4,126,542 | 11/1978 | Carlsmith | 137/13 |

*Primary Examiner*—Hiram H. Bernstein
*Attorney, Agent, or Firm*—William G. Addison

[57] ABSTRACT

In a process for the removal and pressure reduction of a high pressure, high temperature slurry from a process vessel, the slurry is mixed with a make-up liquid in a temperature treatment vessel to form a diluted slurry, which is passed through a cooling apparatus, and a recycle portion of the diluted slurry is recycled to the temperature treatment vessel. Another portion of the cooled diluted slurry solution is flashed to a preselected reduced pressure through a pressure reducing valve, and this portion is passed to a stripping vessel for concentrating and producing a slurry product. In operation, plural slurry gravity settling vessels may be connected to a single heat treatment vessel, thereby effectuating slurry pressure reduction across a single pressure reducing valve.

14 Claims, 1 Drawing Figure

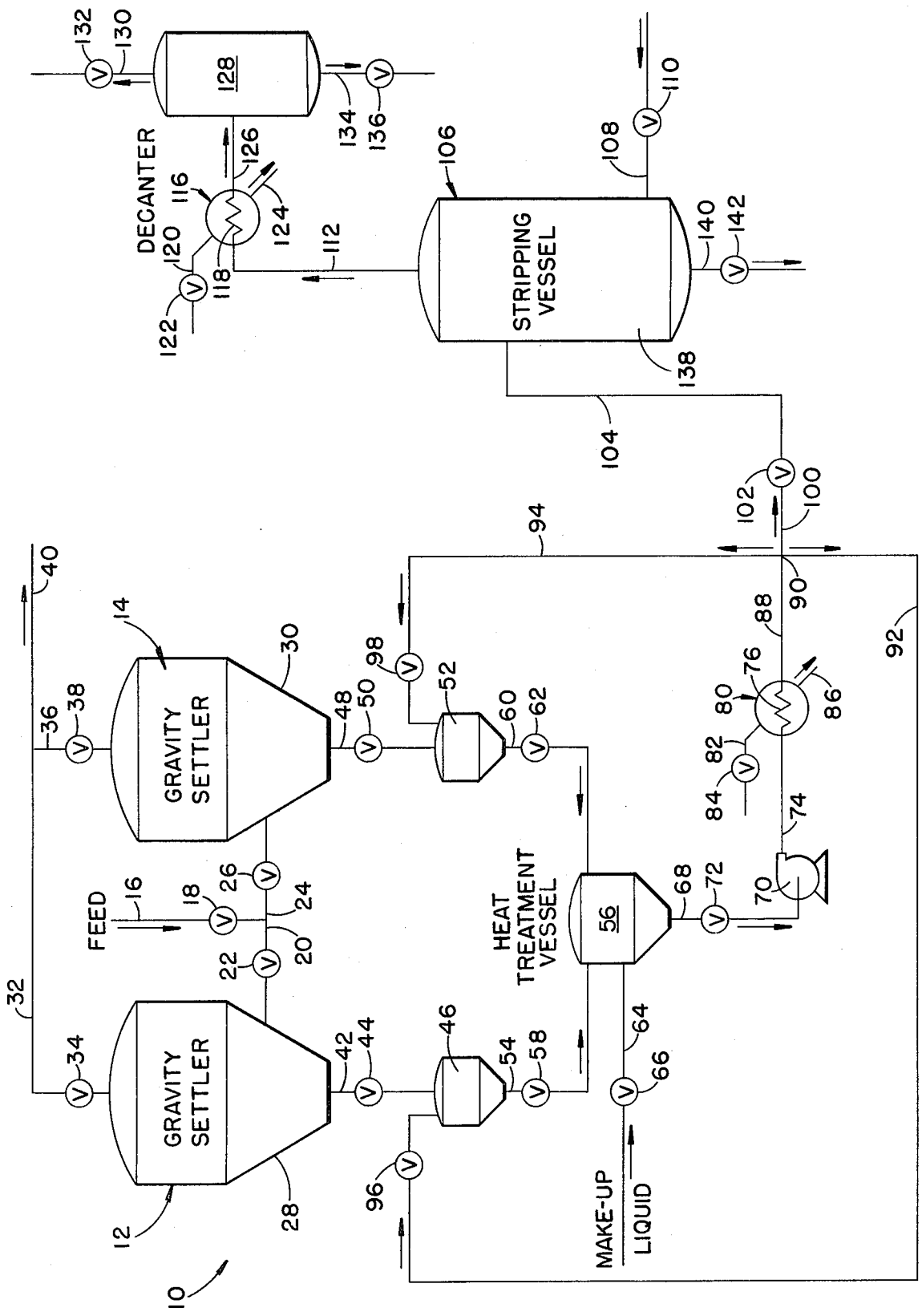

SLURRY REMOVAL PROCESS

BACKGROUND OF THE INVENTION

1. Field of the Invention

The present invention relates generally to the treatment of high pressure, high temperature slurries and more particularly, but not by way of limitation, to a process for efficiently reducing the pressure on such slurries.

2. Description of the Prior Art

In certain chemical processes it often times is necessary to reduce the pressure of high temperature, high pressure slurries to substantially lower pressure conditions. Such pressure reduction usually is achieved by passing the slurry through throttling or reducing valves.

Such valves are subjected to extensive wear and erosion because of the high pressure drop and because of the high temperature exposure of the valve seats. The presence of suspended solids in the slurries accelerates the erosion as the particles are subjected to a high velocity head by the pressure drop. Finally, the flashing that accompanies the pressure reduction across the valve also is a factor in eroding the valves. Even with the use of hard erosion-resistant materials for the construction of the seats and plungers of pressure reducing valves, the valves used for pressure reduction of high pressure, high temperature slurries require frequent replacement. In a commercial processing plant, there may be a large number of pressurized vessels that are utilized for slurry service and which have slurry effluents that are subjected to large pressure reduction. It is understandable therefore that frequent replacement of the large number of pressure reducing valves in such commercial processing plants is undesirable for the obvious reason that this results in excessive operating and maintenance expense.

There are other problems encountered in the use of throttling valves to effect pressure reduction of high pressure, high temperature slurries. Thus, slurries having high concentration of solids contained in low boiling liquids, the flashing taking place across the throttling valves promotes the buildup of solid material within the valves, and this condition often leads to extreme fouling and plugging of the valves. Additionally, the depressurized solid material produced by the spontaneous vaporization of the liquid component of the slurry often results in the formation of one solid mass, making the resultant mass difficult to handle in subsequent processing steps.

The present invention provides an improved technique for removing high pressure, high temperature slurry solutions from processing vessels whereby a minimum number of pressure reducing valves are required, as a single reducing valve can service a plurality of such processing vessels, thereby reducing the frequency of valve replacement. Furthermore, the amount of flashing that occurs across the reducing valve is minimized by the present invention, and the depressurized product is consequently maintained as a readily flowable slurry.

SUMMARY OF THE PRESENT INVENTION

In the process of the present invention, a slurry from one or more high pressure, high temperature vessels is passed to a temperature treatment vessel wherein the slurry is admixed with make-up liquid; the diluted slurry then is passed through a cooling means to effectuate temperature reduction of the diluted slurry; a portion of the cooled diluted slurry is recycled back to the temperature treatment vessel; and another portion of the cooled diluted slurry is passed through a pressure reducing valve to a stripping vessel where the slurry is concentrated and the make-up liquid and entrained solvent is recovered.

BRIEF DESCRIPTION OF THE DRAWINGS

The single sheet of drawing appended hereto illustrates diagrammatically one presently preferred arrangement of apparatus for use in practicing the invention.

DESCRIPTION OF THE PREFERRED EMBODIMENT

In accordance with the present invention, a slurry from a high pressure, high temperature zone is withdrawn and passed to a temperature treatment zone where the slurry is admixed with cooled recycle slurry that is comprised of original high temperature slurry solution that has had a make-up liquid added to it. The present invention permits the withdrawal of slurry solution from any number of high pressure, high temperature vessels, with the slurry streams discharging into the temperature treatment zone simultaneously. The slurry is cooled while substantially maintaining its original pressure, and the cooled slurry product is passed through a pressure reducing valve which absorbs the major portion of the pressure reduction, thus minimal flashing of the slurry occurs because of the lowered temperature of the slurry passing through the reducing valve. As will be discussed below, the slurry product is further treated to permit the recovery and recycling of the make-up liquid to the temperature zone.

The process arrangement of the drawing comprises a pair of gravity settler pressure vessels 12 and 14. Of course, the present invention may be practiced with only one such gravity settler, but the present invention especially finds utility when applied to plural vessels, as the savings generated through the use of the larger number of pressure vessels are much greater. Therefore, the present invention is illustrated with the two gravity settler pressure vessels 12 and 14, with the understanding that there could be a bank of many such vessels serviced by a single temperature treatment zone.

Referring now to the drawing, shown therein is a diagrammatical representation of the presently preferred apparatus to practice the invention.

A feed product comprising a high pressure, high temperature slurry enters the process equipment via a conduit 16 at a rate controlled by a valve 18. The feed slurry solution is directed to the first gravity settler 12 via a conduit 20 through a valve 22, and to the second gravity settler 14 via a conduit 24 through a valve 26. Each gravity settler 12 and 14 has a conical shaped bottom portion 28 and 30, respectively, which collects the suspended solids of the feed slurry as the solid particles settle under the influence of gravity. In some applications, it may be necessary to add a flocculating agent to sequester the particles for gravity settling, but this feature is not essential to the practice of the present invention.

Decanted liquid may be withdrawn from the first gravity settler 12 via a conduit 32 at a rate controlled by a valve 34. In like manner, decanted liquid may be removed from the second gravity settler 14 via a conduit 36 and a valve 38. The output liquid streams in the conduits 32 and 36 are combined to provide a total output liquid stream in a conduit 40 which may be passed to subsequent further processing vessels.

The concentrated slurry that has been accumulated via gravity settling in the bottom portion 28 of the first gravity settler 12 is withdrawn via a conduit 42 and a valve 44 and passed to a mixing vessel 46. The valve 44 is selected to pass the slurry therethrough with a minimum of pressure drop in order to maintain the elevated operating pressure on the feed slurry about the same as in the first gravity settler 12.

In like manner, the accumulated and concentrated slurry in the bottom portion 30 of the second gravity settler 14 is passed via a conduit 48 and a valve 50 to a second mixing vessel 52. The valve 50 is selected to pass the slurry solution while offering minimum pressure drop in order to maintain substantially the elevated operating pressure existing in the second gravity settler 14.

The slurry contained in the mixing vessel 46 is passed via a conduit 54 to a heat treatment vessel 56 at a rate controlled by a valve 58. In the heat treatment vessel 56, the slurry flowing in the conduits 54 and 60 are brought together and admixed with a make-up liquid that is fed from a convenient source to the heat treatment vessel 56 via a conduit 64 at a rate controlled by a valve 66. The mixture of the slurry and the make-up liquid, intimately mixed in the heat treatment vessel 56, is withdrawn therefrom through a conduit 68 and passed through a valve 72 to the suction side of a pump 70. The diluted slurry from the heat treatment vessel 56 is pumped by the pump 70 through a conduit 74 to a coil 76 of a heat exchanger 80. The diluted slurry flowing through the coil 76 is cooled by a process fluid passed through a conduit 82, at a rate determined by a valve 84 to pass in heat exchange relationship to the coil 76, and to an exit conduit 86.

The cooled diluted slurry, or recycle slurry, exits the coil 76 in the heat exchanger 80 via a conduit 88 and is divided by a separating tee 90 into a first portion and into a second portion of cooled, diluted slurry. The first portion of the cooled, diluted slurry passes through conduit 92 and 94 as a recycle to the mixing vessels 46 and 52. One part of the first portion of the diluted slurry passes through the conduit 92 and through a valve 96 into the mixing vessel 46 to be mixed with the slurry that is withdrawn from the first gravity settler vessel 12. Another part of the first portion of diluted slurry passes through the conduit 94 and through a valve 98 into the mixing vessel 52 where it is combined with the slurry that is withdrawn from the second gravity settler vessel 14. In this manner, the slurry in the first and second mixing vessels 46 and 52 is cooled by the recycled cooled, diluted slurry.

The second portion of the diluted slurry exiting the separating tee 90 flows through a conduit 100 and through a reducing valve 102. The reducing valve 102 is selected and set to provide the major pressure reduction that is to occur on the slurry in accordance with the present invention. It is at reducing valve 102 that the cooled and diluted slurry is flashed to a preselected reduced pressure.

The second portion of the cooled recycle slurry is passed from the reducing valve 102 via a conduit 104 into a steam stripping column or vessel 106. Steam is fed into the stripping vessel 106 via a conduit 108 at a rate determined by a valve 110 and passed in countercurrent flow to the downwardly flowing second portion of the cooled recycle slurry to remove the added make-up liquid and solvent in an overhead which passes via a conduit 112 to a condenser apparatus 116. The fluid that exits the stripping column 106 passes through a coil 118 in the condenser 116 and is condensed and cooled by a cooling fluid that is passed through the condenser 116 via a conduit 120 at a rate controlled by a valve 122, brought into heat exchange relationship with the coil 118, and exited from the condenser 116 via a conduit 124. The liquid exits the condenser 116 via a conduit 126 to a decanter vessel 128 wherein overhead liquids and noncondensable vapors are expelled through a conduit 130 and a valve 132 to further processing as may be desired. Collected liquid in the decanter 128 is withdrawn through a conduit 134 and a valve 136 for a further use as make-up liquid or for disposal.

The flashed second portion of the recycle slurry that enters stripping vessel 106 via the conduit 104 flows to a lower portion 138 of the stripping vessel and is accumulated as a low pressure concentrated slurry product which is withdrawn from the stripping column 106 via a conduit 140 at a rate controlled by a valve 142, for further processing or disposal.

To further illustrate the invention, it now will be described in connnection with the treatment of a liquefied coal slurry. More particularly, the input feed slurry flowing through the conduit 16 is a feed taken from the bottom of a vacuum still in a coal liquefaction process in which benzene is used to liquefy finely pulveried coal. As is known in such a process, a slurry, comprising benzene and finely divided, suspended insoluble coal products, is obtained as the bottom slurry of a vacuum still vessel. For purposes of example, this bottom slurry is pumped to the first and second gravity settlers 12 and 14 at an elevated operating temperature of about 525° F. and elevated operating pressure of about 900 p.s.i.a. The insoluble coal products which may be referred to as "ash", settle to the bottom portions 28 and 30 of the first and second gravity settlers 12 and 14. This ash concentrate together with benzene solvent is discharged into the pressurized mixing vessels 46 and 52, and the contents of the mixing vessels are brought together via the conduits 54 and 60 into the heat treatment vessel 56. Water is added to the heat treatment vessel 56 via the conduit 64, and the resultant mixture is passed via the conduit 68, the pump 70 and the conduit 74 through a water cooled heat exchanger 80 to produce the cooled recycle slurry which is divided by the separating tee 90 into a first portion that flows through the conduits 92 and 94, and a second portion that flows through the reducing valve 102 and is flashed to a preselected reduced pressure in the manner described above. The mixing of the first portion of the cooled recycle slurry returned to the first and second mixing vessels 46 and 52 result in a temperature of about 225° F. and a pressure of about 850 p.s.i.a. in those vessels; the combined contents of the first and second mixing vessels 46 and 52 are passed to the heat treatment vessel 56, resulting in conditions of 225° F. and 825 p.s.i.a. in the heat treatment vessel 56; and the slurry is withdrawn from the common heat treatment vessel 56 via the conduit 68 and the pump 70 affords a 225° F. inlet recycle slurry to the heat exchanger 80 and a 200° F. resultant slurry exiting from the heat exchanger 80, with the pump 70 increasing the pressure of the slurry to approximately 875 p.s.i.a. Make-up water from a settling pond or the like provides the make-up liquid that is pumped through the conduit 64 to the heat treatment vessel 56. The make-up liquid, if desired may provide a secondary means of reducing the temperature in the heat treatment vessel 56.

The stripping column 106 is operated at approximately 200° F. and 32.5 p.s.i.a., with steam at approximately 200 p.s.i.a. being fed through the conduit 108 to strip and pass the benzene solvent and the make-up water through the overhead conduit 112 to the condenser 116 where the temperature of the overhead effluent of the stripping column 106 is reduced from approximately 200° F. to approximately 150° F. by the passage of cold water through the condenser 116 via the conduits 120 and 124. This cooled overhead solvent rich fraction passes via the conduit 126 to the decanter vessel 128 where overhead benzene and noncondensable vapor are expelled through the conduit 130, and water is withdrawn from the bottom portion of the decanter vessel 128 via the conduit 134.

Finally, from the bottom portion 138 of the stripping column 106 there is withdrawn a low pressure concentrated slurry product of water and insoluble constituents that may be further processed or routed to a settling pond or the like. Thus the suspended finely divided insoluble coal ash products, as one of the residual products of a coal deashing process utilizing fractionating separation, are maintained in a readily flowable form for ease in disposal treatment.

Thus, it is apparent that the present invention provides a useful and readily adaptable process for effectively and efficiently reducing the pressure on high pressure, high temperature slurries, whereby only one or two reducing valves are usually required regardless of the number of processing vessels. This results in a reduction of the frequency of valve replacement; the amount of flashing across the valve or valves is minimized as the pressure reduction is effected at a reduced temperature; and, attendant solidification problems are avoided as the slurry product is maintained in a readily flowable form.

Changes may be made in the process apparatus or in the steps of the process or in the sequence of the steps of the process of the present invention without departing from the spirit and the scope of the invention as defined in the following claims.

What is claimed is:

1. In the process for removing a slurry containing suspended solids or insolubles from a process vessel maintained at elevated operating temperature and elevated operating pressure, the improvements which comprise:
   passing the slurry from the process vessel to a temperature treatment vessel;
   maintaining the pressure in the temperature treatment vessel substantially equal to the pressure in the process vessel;
   mixing a make-up liquid with the slurry in the temperature treatment vessel;
   withdrawing slurry from the temperature treatment vessel;
   reducing the temperature of the withdrawn slurry;
   returning a first portion of the cooled slurry to the temperature treatment vessel to cool the slurry contained therein; and
   passing a second portion of the cooled slurry through pressure reducing means to flash the second portion of the cooled slurry to a preselected pressure to provide a lower temperature, lower pressure slurry.

2. The process of claim 1 wherein the slurry is a solution of insoluble coal products in an organic solvent.

3. The process of claim 1 wherein the make-up liquid is water.

4. The process of claim 1 in which the flashed second portion of the slurry is concentrated to produce a concentrated slurry product.

5. The process of claim 4 wherein the preselected pressure is about one atmosphere.

6. A process for the removal and pressure reduction of a slurry comprising a liquid and suspended solid or insoluble material, the slurry being at an elevated temperature and at an elevated pressure, comprising:
   mixing a make-up liquid with the slurry in a temperature treatment vessel to form a diluted slurry;
   reducing the temperature of the diluted slurry;
   recycling a first portion of the cooled diluted slurry to the temperature treatment vessel to cool the slurry contained therein; and
   reducing the pressure on a second portion of the cooled diluted slurry to flash the second portion of the cooled diluted slurry to provide a lower temperature, lower pressure slurry.

7. The process of claim 6 further comprising the step of:
   concentrating the solid or insoluble material by removing substantially all of the liquid and the make-up liquid from the flashed second portion of the cooled diluted slurry to produce a low pressure concentrated slurry-product.

8. The process of claim 7 wherein the slurry comprises insoluble coal products suspended in an organic solvent.

9. The process of claim 8 wherein the organic solvent substantially comprises benzene.

10. In the deashing of coal in which coal ash products are removed by liquefying the coal in an organic solvent to form a slurry of coal liquefaction products and suspended finely divided insoluble coal and ash products, the improvements which comprise:
   effectuating phase separation of the slurry to produce a solvent rich fraction and a concentrated slurry, the solvent rich fraction containing solvent and coal liquefaction products, and the concentrated slurry containing solvent and suspended finely divided insoluble coal and ash products;
   mixing a make-up liquid with the concentrated slurry in a temperature treatment vessel to form a diluted slurry;
   reducing the temperature of the diluted slurry;
   recycling a first portion of the cooled diluted slurry to the temperature treatment vessel to cool the slurry contained therein; and
   reducing the pressure of a second portion of the cooled diluted slurry by flashing the second portion to a preselected reduced pressure to provide a lower temperature, lower pressure slurry.

11. The process of claim 10 in which;
   the insoluble material is concentrated by removing substantially all of the solvent and the make-up liquid from the flashed second portion of the cooled diluted slurry to produce a concentrated slurry product.

12. The process of claim 10 wherein the selected reduced pressure is approximately atmospheric pressure.

13. The process of claim 10 wherein the organic solvent substantially comprises benzene.

14. A process for removing and reducing the pressure on a slurry containing suspended solids or insolubles from a plurality of process vessels which are operated at an elevated temperature and an elevated pressure, comprising the steps of:

withdrawing a slurry stream from each of the process vessels;

combining the slurry streams in a temperature treatment vessel;

mixing a make-up liquid with the combined slurry streams in the temperature treatment vessel;

withdrawing slurry from the temperature treatment vessel;

cooling the withdrawn slurry;

returning a first portion of the cooled slurry to the temperature treatment vessel to cool the slurry contained therein; and flashing a second portion of the cooled slurry to reduce the pressure of the second portion to a preselected reduced pressure to provide a lower temperature, lower pressure slurry.

* * * * *